US005708422A

United States Patent [19]
Blonder et al.

[11] Patent Number: 5,708,422
[45] Date of Patent: Jan. 13, 1998

[54] TRANSACTION AUTHORIZATION AND ALERT SYSTEM

[75] Inventors: Greg E. Blonder, Summit; Steven Lloyd Greenspan, Scotch Plains; J. Robert Mirville, Manalapan; Binay Sugla, Aberdeen, all of N.J.

[73] Assignee: AT&T, Middletown, N.J.

[21] Appl. No.: 455,939

[22] Filed: May 31, 1995

[51] Int. Cl.$^6$ .................................................. H04Q 1/00
[52] U.S. Cl. ................... 340/825.34; 340/825.31; 340/825.33; 340/825.35; 379/91; 379/144
[58] Field of Search .................. 379/91, 59, 144; 235/380; 340/825.31, 825.32, 825.34, 825.33, 825.35

[56] References Cited

U.S. PATENT DOCUMENTS

| | | | |
|---|---|---|---|
| 4,554,418 | 11/1985 | Toy | 179/2 DP |
| 5,208,446 | 5/1993 | Martinez | 235/380 |
| 5,388,148 | 2/1995 | Seiderman | 379/59 |
| 5,422,468 | 6/1995 | Abecassis | 235/380 |
| 5,422,959 | 6/1995 | Lee | 382/119 |
| 5,521,966 | 5/1996 | Friedes | 379/91 |

OTHER PUBLICATIONS

McLellan, "The Future of Data Security Looks Credit–Card Thin" Information Week, p. 24, Oct. 7, 1985.

*Primary Examiner*—Brian Zimmerman
*Attorney, Agent, or Firm*—Henry T. Brendzel

[57] ABSTRACT

An automated method for alerting a customer that a transaction is being initiated and for authorizing the transaction based on a confirmation/approval by the customer thereto. In accordance with one illustrative embodiment, a request to authorize the transaction is received, wherein the request includes a customer identifier; a determination is made whether to authorize the transaction based on the customer identifier; if the determination is to authorize the transaction, that fact is communicated to the customer; a confirmation that the transaction should, in fact, be authorized is received back from the customer; and the transaction is authorized in response to the customer's confirmation thereof. In accordance with another illustrative embodiment, a transaction initiated by an agent of the customer (i.e., the principal) is authorized by the principal when one or more threshold parameters that may be pre-defined by the principal are exceeded. A preferred method of alerting the customer and receiving a confirmation to authorize the transaction back from the customer is illustratively afforded by conventional two-way pagers.

55 Claims, 11 Drawing Sheets

FIG. 2

| 201 | 202 | 203 | 204 |
|---|---|---|---|
| CARD NUMBER | REQUESTED CREDIT AMOUNT | MERCHANT CODE | VALIDATION REQUEST CODE |

FIG. 4

| 401 | 402 | 403 |
|---|---|---|
| CARD HOLDER'S NAME | CREDIT CARD | FIELD FROM TABLE 5 |

FIG. 5

| | |
|---|---|
| 501 | CHARGING LIMIT EXCEEDED BY $XXX.XX — 504 |
| 502 | WAS USED FOR XX TRANSACTIONS WITHIN 24 HOURS |
| 503 | WAS USED AT XXXX |

| MERCHANT CODE | ESTABLISHMENT TYPE |
|---|---|
| 1234 | LIQUOR STORE |
| 4567 | HOTEL |
| 5678 | RACE TRACK |

FIG. 3

| RECORD # | CARD HOLDER'S NAME | CARD NUMBER | ALERT/APPROVAL | | TRIGGER | | | COMMUNICATIONS ADDRESS | NO ANSWER CREDIT THRESHOLD | NO ANSWER TRANSACTION THRESHOLD |
|---|---|---|---|---|---|---|---|---|---|---|
| | | | ALERT FLAG | APPROVAL FLAG | CONDITIONS | MAXIMUM # OF TRANSACTIONS PER DAY | TRANSACTION COUNTER | | | |
| 1 | JOHN SMITH | 503 456 7890 1234 | YES | NO | >100 | — | — | PAGER # 201 432 1098 | — | — |
| 2 | ROB | 504 567 8901 1234 | YES | YES | >300 | >3 | 3 | TEL # 900 555 6789 | 350 | >4 |
| 3 | PEDRO GONZALEZ | 506 789 0012 3456 | YES | NO | MC=1234 MC=4567 | >4 | 2 | TEL # 500 555 1234 | — | — |
| 4 | JIMMY | 507 890 1123 4567 | YES | YES | >150 | — | 1 | PAGER # 908 901 2345 | 200 | >2 |
| .... | .... | .... | .... | .... | .... | .... | .... | .... | .... | .... |
| N | BOB | NNN XXX XXXX XXXX | YES | YES | >NNN | — | X | PAGER # NNN XXX XXXX | XXX | >N |
| 311 | 301 | 302 | 303 | 304 | 305 | 306 | 307 | 308 | 309 | 310 |

TRANSACTION AUTHORIZATION AND ALERT SYSTEM

FIELD OF THE INVENTION

This invention relates to a transaction authorization and alerting system, and more particularly to a method and apparatus for using a communications system to alert an interested party of a recently completed transaction and/or to obtain authorization from the interested party for a pending transaction.

BACKGROUND OF THE INVENTION

The credit card identification numbers assigned to credit card customers are presented to many different people in a variety of circumstances—when applying for financial services, when concluding purchases in a store, and when making purchases over the telephone, through the mail, or over e-mail (electronic mail). The large number of people that have access to a customer's credit card number has frequently led to fraud. The advantages of using credit cards, however, are substantial. The customer finds their use advantageous in that he or she need not carry cash or write checks. Credit card purchases also have advantages to the retailer as compared, for example, to payment by check, since the credit card service provider ensures timely payment to the retailer, regardless of when the customer pays the balance on the credit card account. However, credit cards or credit card numbers are often stolen, and credit card numbers are often used over the telephone or through the mail without any secure mechanism for confirming the customer's identity.

Telephone calling card numbers have security problems similar to those of credit cards. These numbers are often spoken aloud or entered through a touch tone keypad, thereby allowing others the opportunity to record them (either electronically or by mere observation), and to then fraudulently use the numbers. Another common source of fraud stems from authorized usage of a credit card or a telephone calling card followed by a customer denial that he or she made the purchase or placed the call. Thus, simply controlling access to the credit or calling card number without more may be inadequate. Computer access to secure databases is yet another example of a transaction that depends upon private customer identifiers (i.e., passwords) which through legal or illegal channels may become known to others, thereby allowing unauthorized access to these databases.

Prior art mechanisms for handling such security concerns have not taken advantage of advances in communications and computer systems to automate the alerting and approval process. Most techniques which have heretofore attempted to address these security issues tend to significantly increase the complexity of the communication protocol. For example, the customer may be asked additional questions (the answers to which it is expected that only the authorized party would know), or may be required to provide additional information as a part of each transaction such as a (secret) Personal Identification Number (PIN). Moreover, it may be required that such PINs be modified on a routine basis in order to maintain their secrecy. To encourage customers to make use of these types of services (e.g., credit and calling cards), it has become common to limit the liability of the customer while increasing the liability of the service provider (e.g., the credit card vendor or telephone company). Unfortunately, unauthorized uses usually go undetected until a periodic service report is issued—typically, at the end of a monthly billing cycle and long after the fraud was perpetrated.

In addition to the above-described security issues, one commonly desired class of financial transactions involves a principal who empowers an agent to initiate and complete routine transactions without the principal's knowledge or approval. However, the principal often reserves the right to be alerted to, or even to approve, such transactions, particularly when they are identifiably non-routine or atypical. For example, approval may be required when certain threshold parameters that are associated with the transaction (which may, for example, be pre-defined by the principal) are exceeded.

Prior art mechanisms for handling such agent initiated transactions have also not taken advantage of advances in communications and computer systems to automate the alerting and approval process, thereby limiting the scope of applications of such transactions. For example, a card owner, such as a corporation (parent) that provides an employee (young adult) with a credit/debit card to charge business (personal) expenses, typically places certain restrictions on the use of the card by the cardholder to prevent abuses, excesses or fraud. Those restrictions include, for example, upper limits on either the total amount of money that can be charged to a commercial credit card, or the number of transactions that can be authorized for a credit card number within a predetermined period of time. Those restrictions sometimes operate to deny access to credit to a cardholder who is stranded or facing an emergency situation, when ironically credit is most needed. This clearly defeats the purpose of empowering the employee or young adult. Yet, oversight of the use of those credit cards by the card owners is still needed since the card owners are ultimately financially responsible for the expenses charged to those credit cards. This issue takes particular significance when one considers that merchants concerned about lack of legal competency of minors to complete card transactions have been reluctant to accept debit or credit cards as a means of payment from minors. Hence, another specific problem of the prior art is lack of a flexible restriction mechanism for principals to limit monitor, and/or approve use of a card by cardholder for non-routine commercial transactions.

SUMMARY OF THE INVENTION

We have recognized that the aforementioned problems result from the inability to quickly and efficiently inform the individual customer (e.g., the account holder or the principal) that his or her customer identifier (e.g., credit/debit/calling card number, PIN, password, etc.) is being used in a transaction for a particular purpose, and the inability of the customer to respond thereto in order to confirm or deny its use. Thus, in accordance with certain illustrative embodiments of the present invention, an automated method for authorizing a transaction is provided in which the customer is informed of a pending authorization thereof, and the transaction is then authorized only in response to a customer confirmation. In accordance with certain other illustrative embodiments, the invention provides a method and a system which allow a principal to be automatically alerted to, and/or to promptly authorize, an agent-initiated transaction which may, for example, be deemed atypical based on a pre-stored profile specified by the principal.

In accordance with one illustrative embodiment, a request to authorize a transaction is received, wherein the request includes a customer identifier; a determination is made whether to authorize the transaction based on the customer identifier; if the determination is made to authorize the transaction, the pending authorization is communicated to the customer; a confirmation that the transaction is, in fact, to be authorized is received back from the customer; and the transaction is authorized in response to the customer's confirmation thereof.

One approach to communicating such a determination to authorize the transaction and to receive such a confirmation to authorize from the customer is illustratively afforded by conventional two-way pagers. For example, a computer database, charged with the task of authorizing a transaction, may signal the customer via paging whenever his or her customer identifier is used. Along with this notification, relevant information may be displayed on the pager's alphanumeric (or numeric) display. The customer may then respond (via the two-way pager) by confirming or denying the pending authorization.

According to one aspect of the invention, exception conditions that trigger a customer's alerting or approval process may be stored in a profile specified by the customer. This profile associates those exception conditions to a personal communications address, such as a paging number or a "500" or "700" prefix telephone number at which the customer can be reached. For credit/debit and calling card transactions, exception conditions may be caused, for example, by a request for credit amount (or number of transactions) above threshold parameters pre-imposed by the card owner for the use of the card, or breach of other conditions pre-defined by the card owner for the use of the card. In accordance with the principles of the invention, the card owner may elect to simply receive the alert message or to authorize/deny the charging of the expenses to the card number by transmitting an approval/disapproval message to the card issuer as part of the card validation process.

According to another aspect of the invention, a merchant may request the approval of a parent or guardian to a debit/credit card transaction, such as a stored-value smartcard, presented to the merchant by a minor alleging to act on behalf of the parent or guardian. In that case, the card number, or a proxy thereof, may be used as a search key to retrieve the parent or guardian's profile that identifies a communications address for the parent or guardian. The transaction is approved only if an authorization message is received from the parent or guardian.

BRIEF DESCRIPTION OF THE DRAWINGS

FIG. 2 illustrates an exemplary message that is transmitted by an automatic dialing unit at a merchant's location to a card issuer's validation database.

FIG. 3 shows an illustrative table that associates alerting threshold parameters to card numbers.

FIG. 4 shows an illustrative generic message that is transmitted by an automatic dialing unit at a merchant's location to a card owner's communications device.

FIG. 5 shows specific exemplary messages that may be transmitted by a card validation system to a card owner's communications device.

FIG. 6 is a table that correlates merchant codes to types of commercial establishments.

DETAILED DESCRIPTION

Introduction

Although the principles of the present invention may be applied to many domains, the illustrative embodiments described in detail herein will focus on a credit card or debit card purchase transaction. In these embodiments, a cardholder, who may or may not be the customer of the credit or debit card issuer, uses a credit or debit card (or a credit card number) to instruct a retailer (a provider of a product or service) to charge a purchase to the given credit card account or to debit the amount of the purchase from the given debit card account. The credit or debit card number serves as a customer identifier to the credit card service provider (e.g., the issuer of the credit card).

Figure 1:
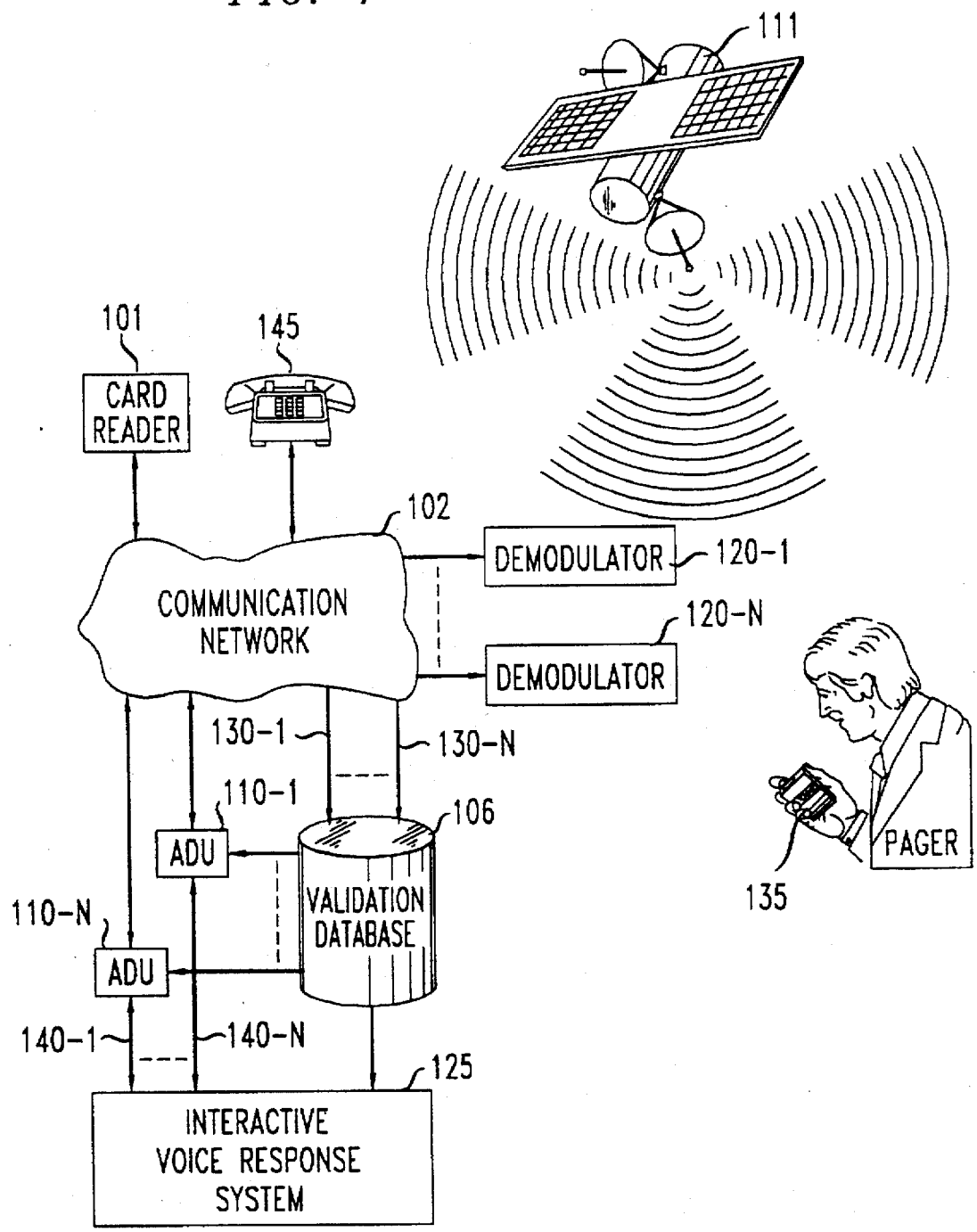
FIG. 1 is a telecommunication system arranged in accordance with the invention to allow a card owner to authorize, or to be alerted to transactions charged to the card by a cardholder.

FIG. 1 shows a communications system arranged in accordance with certain illustrative embodiments of the present invention to implement the principles thereof. The communications system of FIG. 1 includes a communications network 102, a validation database 106 and a paging system network 111. Communications network 102 includes one or a series of interconnected communications switches arranged to relay to validation database 106 (via lines 130-1 to 130-N) information received from card reader 101. Specifically, when a credit card holder hands a credit card to a merchant to charge expenses associated with a transaction, the merchant slides the credit card through card reader 101 to read the credit card number, for example, off the magnetic stripe on the back of the credit card. An automatic dialing unit included in card reader 101 dials a telephone number associated with a database 106 of the card issuer to validate the card number. In particular, card reader 101 transmits to validation database 106 a validation request message that is illustratively represented in FIG. 2.

Similarly, when the cardholder wishes to use a debit card such as an Automatic Teller Machine (ATM) card as a means of payment for a commercial transaction, the merchant enters a special code into card reader 101 to initiate the alerting and approval process. Thereafter, card reader 101 retrieves the debit card number, for example, from the magnetic stripe on the back of the debit card before prompting the cardholder for a secret code (e.g., a PIN). Card reader 101 then transmits to validation database 101 a validation request message that is illustrated in FIG. 2.

The message shown in FIG. 2 includes a card number 201, a requested credit amount 202, a merchant code 203, and a validation request 204. When card number 201 is a debit card number, it also includes the PIN entered by the cardholder. Merchant code 203 is a field that identifies the type of business from which the message associated with the transaction, is transmitted. Typically, the merchant code 203 is appended by card reader 101 after the requested credit amount 202 has been entered by the merchant, and the calling card number 201 has been retrieved from the magnetic stripe on the back of the card. The validation request field 204 stores the code entered by a merchant to receive approval from the party authorized to give such approval for a debit card transaction. In the case where the cardholder is a minor, for example, by requesting approval of the transaction from a parent or guardian of the minor (i.e., the authorized party), the merchant and the debit card issuer are assured that the transaction cannot be voided by the minor at a later date on the ground that the minor lacked legal competency to enter into such transaction.

Upon receiving a validation request message, validation database 106 uses card number 201 as a search key to perform a table look-up operation for the purpose of retrieving the profile associated with the card number. When the cardholder is a minor, and the card is a stored-value smartcard, a passphrase or proxy information provided by the minor may be used as search key to retrieve the profile of FIG. 3.

Validation database 106 is a processor-controlled centralized database facility which is a repository of records or profiles for all credit/debit card numbers assigned by a card issuer to its customers. Validation database 106 is designed to authorize transactions charged to card numbers stored therein. Such authorization may be based on a set of pre-defined parameters included in the profiles associated with the card numbers. When a retrieved profile does not include a requirement for alerting or approval, validation of the card number may be performed in a conventional manner. When a profile stores alerting parameters that may require communications with one or more called parties, validation database 106 uses one of the Automatic Dialing Units (ADU) 110-1 to 110-N to dial a telephone number retrieved from a profile associated with a card number.

Shown in FIG. 3 is an illustrative table that associates alerting and approval threshold parameters to credit card numbers. Each record in the table of FIG. 3 is a profile for a credit card number that is used to determine the manner in which transactions charged to that credit card number are processed. The table of FIG. 3 includes a cardholder's name field 301; a card number field 302; alert and authorization flags 303 and 304, respectively; a trigger group of fields; a communications address field 307; a no-answer-credit threshold field 309; and a no-answer-transaction threshold field 310. Cardholder's name field 301 stores the name of a card holder associated with a particular card number. The cardholder's name field may contain, for example, the first and last name of the cardholder (as shown for the first and third record) or the first name (or nickname) of the cardholder (as shown for the second and fourth record). Credit card number 302 is used as a search key in the table lookup operation mentioned above, to retrieve the profile associated with that card number. The alert flag field 303 indicates that the card owner is to be notified, although possibly only under certain conditions. Such notification may be required, for example, when processing of the transaction would either cause certain conditions pre-defined for the use of the card to be breached, or a threshold parameter to be exceeded. The approval flag field 304 alerts the card issuer that credit card transactions that violate pre-established conditions need to be authorized by the card owner as part of the card validation process. These pre-established conditions may be pre-selected by the card owner or they may be conditions imposed by the card issuer. The trigger group of fields depicted in FIG. 3 illustratively shows different parameters which cause a card owner to be notified when those parameters exceed certain pre-defined thresholds. The "conditions" field 305 shows restrictions pre-selected by the card owners for use of their credit cards. For example, the first record indicates that the card owner wishes to be alerted whenever a cardholder charges more than one hundred (100) dollars to the credit card number. The third record illustrates that the card owner wishes to authorize any credit card transaction for more than three hundred dollars. By contrast, the owner of the credit card number associated with the third record wishes to be alerted whenever that card is used at commercial establishments associated with specific merchant codes. Some card issuers assign distinct merchant codes to commercial establishments, such as bars, hotels and liquor stores, thereby allowing credit card transactions at those establishments to be easily identified.

Other restrictions that may be imposed by a card owner may include, for example, the "maximum number of transactions" field 306 which defines an upper limit on the number of transactions that can be charged to a credit card number within a predetermined period of time. For example, the second record indicates that the card owner's approval is required to validate a credit card transaction when more than three credit card transactions have already been processed for that credit card number within a twenty-four (24) hour period. Such a condition may be useful, for example, in detecting fraudulent use of a stolen credit card. When a transaction threshold number is used as a parameter for processing a credit card transaction, the transaction counter field 307 is incremented by 1 (one) every time a credit card transaction is processed. The transaction counter field 307 is reset to "0" after the predetermined period (e.g., 24 hours) has expired. It will be appreciated that only a limited number of restrictions and/or authorizations are shown in FIG. 3 for ease of explanation, even though many other restrictions, obvious to those of ordinary skill in the art, may be requested by card owners or card issuers for inclusion in the profile of FIG. 3.

Whenever a card owner is to be notified of a condition-breaching credit card transaction, the communications address field 308 may be used to identify a telephone number or an electronic mail address at which the card owner can be reached. Preferably, the communications address field stores a pager number associated with a communications carrier which provides paging service on a nationwide basis to contact, for example, the card owners associated with the first and the fourth record. Alternatively, a personal telephone number, such as a "500" or a "700" prefix number may be used as a reach number for a card owner, such as the card owner associated with the second and third record shown in FIG. 3. As another alternative, an electronic mail address may be used which, in various illustrative embodiments, may be either an address to which conventional electronic mail may be sent or an electronic address for use in other forms of electronic signaling such as, for example, a direct message communicated to the computer screen of a logged-on user or an interactive electronic two-way communication mechanism (e.g., a "chat" or "talk" program).

Also included in the profile of FIG. 3 is no-answer-credit threshold field 309 and no-answer-transaction threshold field 310. Those fields identify respectively, the maximum amount of credit that can be approved, and the maximum number of permissible transactions within a given period of time, when the card owner cannot be reached by the communications system of FIG. 1. When the card owner does not wish any transactions to be authorized when he or she cannot be reached, then those fields are set to zero.

When the cost associated with the commercial transaction is charged to a debit card, as opposed to a credit card, only the card holder's name field 301, the card number field 302 and the communications address field 308 are of particular relevance since the request for approval is initiated by the merchant and the commercial transaction is not completed when the debit card holder cannot be reached.

Referring back to FIG. 1, when a transaction request message, such as the one illustrated in FIG. 2, is received by validation database 106, the latter uses a) the information included in that message, and b) the retrieved profile associated with the card number in that message to determine whether at least one card owner pre-imposed condition has been breached (or a card owner pre-defined threshold has been exceeded). If so, validation database 106 fetches the communications address of the credit card owner and any other appropriate information to format an authorization request and/or alert message that is transmitted to the card owner. One such message is illustrated in FIG. 4 which shows a card holder's name field 401, a display field 402 and a field 403 that is populated by an entry in the table illustrated in FIG. 5. The card holder's name is populated by the name that is included in the profile retrieved by validation database 106. Field 402 is a display field that always contains the two words "Credit Card." Field 403 is populated by one of the entries in the table of FIG. 5.

The table of FIG. 5 shows three separate entries 501, 502 and 503 representing different sections of three different messages. Each entry is comprised mainly of display information and one field that is populated based on the particular condition that has been breached or the specific threshold that has been exceeded. For example, when the requested credit amount for the transaction exceeds the charging limit pre-selected by the card owner, field 505 will be populated by the difference between the maximum charging amount and the requested credit amount. Similarly, when validation of a card number for a transaction would cause the maximum number of transactions per day pre-selected by the card owner to be exceeded, the content of the transaction counter field is moved into field 506. Likewise, when the card holder attempts to charge to a credit card number the expenses related to the purchase of an item from a commercial establishment that is associated with a prohibited merchant code, that code is translated to one of the establishment type entries shown in the table of FIG. 6. That table correlates each merchant code to a particular type of commercial establishment. For example, hypothetical merchant code 1234 is associated with liquor stores, while fictitious merchant code 4567 is mapped to hotels and motels. Thus, once a merchant code is mapped to a commercial establishment type entry, that entry is simply copied to field 507 of FIG. 5.

By populating field 403 of FIG. 4 with one of the entries in FIG. 5, a complete message is formulated for transmission to the card owner. Thereafter, validation database 106 retrieves the communications address in the profile to send to the card owner the message illustrated in FIG. 4 via an idle automatic dialing unit selected from ADU 110-1 to ADU 110-N. The latter are arranged a) to initiate phone calls by dialing telephone numbers received from validation database 106 and, b) to bridge those calls to other communications devices upon detecting a feedback signal from the card owner. ADU 110-1 to 110-N are also designed to terminate the call if no feedback signal is received after a predetermined period of time.

If the communications address is a personal telephone number, such as a "500" or "700" prefix number (shown, for example, in the third record of FIG. 3), then database 106 transmits the message illustrated in FIG. 4 to Interactive Voice Response System (IVRS) 125 before sending the communications address of the card owner to an idle ADU. Upon receiving the number dialed by ADU 110-1, for example, communications network 102 translates the "500" or "700" prefix telephone number to a Plain Old Telephone Service (POTS) telephone number at which the card owner can be reached. When ADU 110-1 detects a feedback signal from the card owner, it bridges the call (via line 140) to Interactive Voice Response System (IVRS) 125 that delivers the message of FIG. 4 in audio form to the card owner at telephone set 145, for example. Specifically, IVRS 125 is a processor that executes text-to-speech synthesis programmed instructions designed to use ASCII input, such as one of the messages shown in FIG. 4, to generate a "read aloud" audio rendition of that ASCII input in a machine synthesized voice. IVRS 125 is also arranged to prompt a card owner to provide some input to approve or disapprove a particular transaction. For example, a card owner may be prompted to enter a "1" on a telephone dialpad to approve a transaction, or a "2" on the dialpad to disapprove the transaction. Also included in IVRS 125 is a means to respond to touch-tone commands from a caller. In particular, IVRS 125 is arranged to translate the Dual Tone Multi-Frequency (DTMF) signal received from the card owner to a machine-readable format, such as ASCII, that is recognizable by validation database 106. Alternatively, IVRS 125 may include a word recognition unit that is arranged to output digitally recorded words, such as the messages in FIG. 5, to prompt a card owner for particular information that is converted to ASCII format for delivery to validation database 106. Furthermore, in order to insure that the person approving the transaction is the card owner, as opposed to an impostor, IVRS 125 may also include a speaker recognition unit that stores templates of pre-recorded digitized voice messages of the card owner that are compared to any input received from the called party to certify that the "real" card owner is the person approving the transaction.

If the communications address is a paging telephone number, then one of the ADUs 110-1 to 110-N dials the paging telephone number to initiate a call to that paging telephone number for the purpose of delivering one of the messages of FIG. 4 to pager device 135 of the card owner. The call is routed over communications network 102 which uses one of the demodulators 120-1 to 120-N to transform the received message into proper signaling format for delivery to paging system network 111 which may be, for example, a satellite-based nationwide paging service network. Alternatively, paging system network 111 may be a cellular communications network or a Personal Communications Services (PCS) network. Paging system network 111 includes a base station (not shown) that receives the dialed number along with the message of FIG. 5. The base station then identifies a particular frequency associated with that paging telephone number to code the received message as a series of pulses represented by a carrier that is modulated on that frequency for delivery to pager 135. The latter converts the pulses into a series of bytes representing the message of FIG. 5. Thereafter, pager 135 emits a loud beep to signal the card owner of an incoming message. Alternatively, pager 135 could be a vibrating pager which silently alerts the card owner of the incoming message through a vibration signal generated therein in response to the reception of a message.

When the incoming message is an alert signal from validation database 106, pager 135 can be any commercially available paging device with a small screen for displaying the message of FIG. 4. However, if an approval/disapproval response is requested by validation database 106, pager 106 may advantageously be a two-way paging device, such as the device available from Mobile Telecommunications Technology Inc. of Jackson, Miss. In that case, the card owner transmits an approval/disapproval message by entering a pre-defined code in the two-way pager. The pre-defined code is then transmitted to validation database 106 via paging system network 111. The pre-defined code is received by one of the demodulators 120-1 to 120-N which demodulates the signals associated with the received code for presentation to validation database 106. Alternatively, pager 135 may be a one-way pager. In this case, if an approval/disapproval response is requested by validation database 106, the card owner may communicate an approval/disapproval message to validation database 106 by other means, such as with use of a conventional telephone, for example.

A First Illustrative Embodiment

Figure 7:
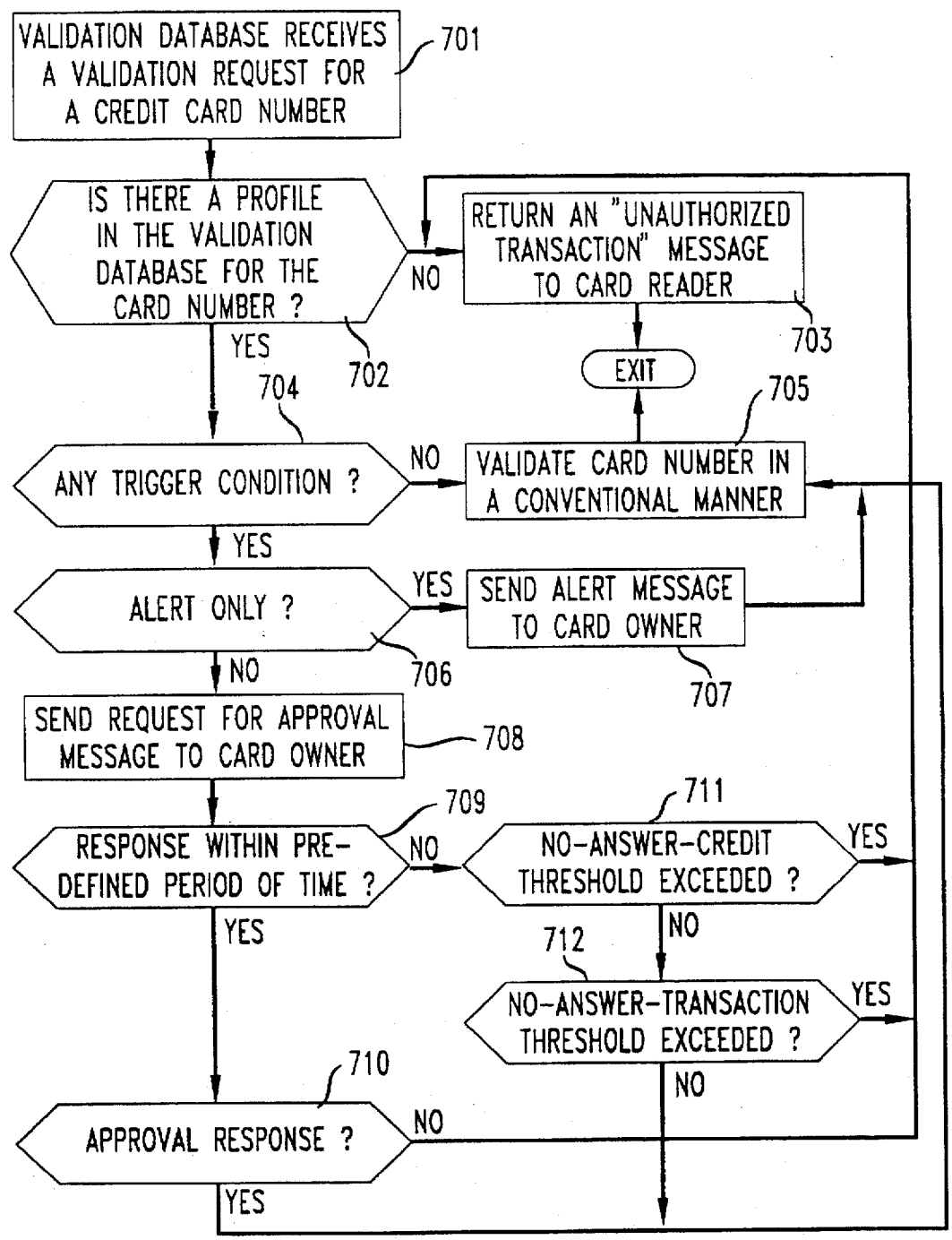
FIG. 7 shows a flow diagram outlining illustrative programmed instructions executed by different elements of the communications system of FIG. 1 to receive approval for, or to alert a credit card owner to, a credit card transaction initiated by a card holder in accordance with certain illustrative embodiments of the present invention.

FIG. 7 shows a flow diagram in accordance with certain illustrative embodiments of the present invention outlining programmed instructions executed by different elements of the communications system of FIG. 1 to receive an approval from a credit card owner for, or to alert a credit card owner of, a credit card transaction initiated by a card holder. The process shown in FIG. 7 is initiated in step 701 when validation database 106 receives a validation request for a credit card number. As mentioned above, the request for approval may be received in the form of a data message, such as the one illustrated in FIG. 2. Upon receiving the credit card number, validation database 106 uses the received credit card number as a search key in an attempt to retrieve a profile for the credit card number. If no profile is available in the validation database for the credit card number, as determined in step 702, validation database returns an "unauthorized transaction" message to card reader 101 via communications network 102. When validation database 106 is able to retrieve a profile for the card number, the profile is analyzed in step 704 to determine whether the requested credit amount or the type of transaction, for example, triggers any alerting or request for approval conditions. If no such conditions are triggered, validation database 106 proceeds with the validation process in a conventional manner. Otherwise, in step 706, validation database 106 ascertains whether the card owner is only to be alerted when the pre-defined condition is encountered. If so, validation database 106 retrieves from the profile the card owner's communications address to which the alerting message is sent, as indicated in step 707. Thereafter, validation database 106 proceeds with the validation process in a conventional manner.

When the profile retrieved by validation database 106 indicates that the card owner is to approve the credit card transaction (such as the one requested by the card holder) validation database 106 formulates a request for approval message (using appropriate entries in FIG. 4 and FIG. 5) for transmission to the card owner, as indicated in step 708. As mentioned above, the request for approval message may be delivered in the form of a telephone call or a paging message. After the transmission of the message, validation database waits for a response from the card owner. When validation database determines, in step 709, that no response is forthcoming after a pre-defined period of time has expired, validation database 106, in step 711, assesses whether the requested credit amount exceeds the no-answer-credit threshold. As indicated earlier, the no-answer-credit threshold is a field in the profile for a card number which stores the maximum amount of credit that can be approved for a credit card transaction when the credit card owner cannot be reached by the communications system of FIG. 1. If the requested credit amount exceeds the no-answer-credit threshold, as determined in step 711, then validation database 106 returns an "unauthorized transaction" message to card reader 101. If the requested credit amount does not exceed the no-answer-credit threshold, the content of the transaction counter field in the profile is compared to the no-answer-transaction threshold to determine whether this threshold has been exceeded. If so, validation database 106 returns an invalid card message to card reader 101, as indicated in step 705. If neither of the no-answer-thresholds has been exceeded, validation database 106 completes the validation process in a conventional manner, as indicated in step 703.

When validation database 106 receives a response from the card owner within a pre-defined period of time, as determined in step 709, validation database 106 then assesses whether the response indicates approval of the transaction by the card owner. If so, validation database completes the validation process in a conventional manner, as indicated in step 705. Optionally, the cardholder may be required to provide a secret code that matches a similar code included in the response received from the card owner before the transaction is authorized. If a disapproval response is received from the card owner, validation database 106 returns an "unauthorized transaction" message to card reader 101.

Figure 8:
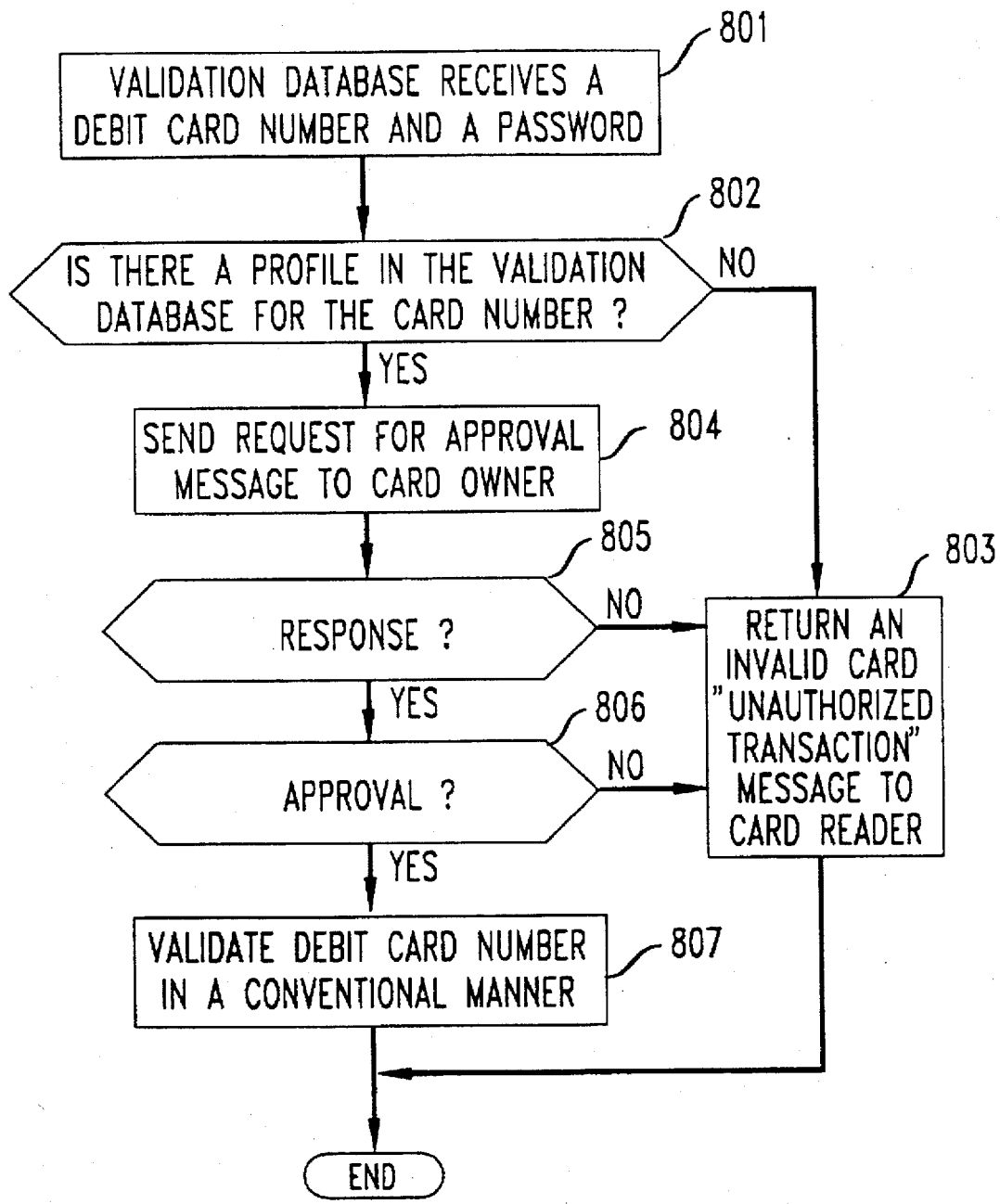
FIG. 8 is a flow chart of illustrative programmed instructions executed by various components of the communications system of FIG. 1 to receive approval from a parent or a guardian of a minor initiated debit card transaction in accordance with a first illustrative embodiment of the present invention.

FIG. 8 is a flow chart outlining instructions performed by the elements of the illustrative communications system of FIG. 1 to validate a debit card transaction in accordance with a first illustrative embodiment of the present invention. The process depicted in FIG. 8 is initiated in step 801 when validation database 106 receives a debit card number and a password entered by a minor card holder. Validation database 106 launches a query on its storage devices to determine, in step 802, whether a profile can be retrieved for the received card number. If no profile is found, validation database 106 transmits an "unauthorized transaction" message to card reader 101, as indicated in step 803. Upon retrieving a profile for the card number, validation database 106 formulates a message using one of the entries of FIG. 4 for transmission to the card owner. Thereafter, validation database 106 waits a pre-defined amount of time to determine whether a response is received from the card owner. If the pre-defined amount of time expires before a response is received from the card owner, validation database 106 returns an "unauthorized transaction" message to card reader 101, as indicated in step 803. When a response indicative of the card owner's approval of the transaction is received from the card owner, as determined in step 806, validation database 106 proceeds with the validation process in a conventional manner, as indicated in step 807. If the card owner sends a message disapproving the debit card transaction, validation database 106 sends an "unauthorized transaction" message to card issuer 101, as indicated in step 803.

In other illustrative embodiments of the present invention, the authorization of a transaction may need to be approved by more than one party. For example, if the charge account is a corporate account and the amount of the charge is over a certain predefined threshold, it may be required that two authorized parties (e.g., corporate executives) approve the transaction. This is analogous, for example, to the common requirement that corporate checks over a certain amount (e.g., $1,000) include two authorized signatures to be valid. Similarly, if the transaction involves, for example, the dispensing of medications in a hospital (see below), it may be desirable that both the patient's doctor and the hospital's pharmacist approve the treatment. In these cases, step 806 of FIG. 8 is modified to determine whether all parties which are required to approve the transaction have done so.

A Second Illustrative Embodiment

Figure 9:
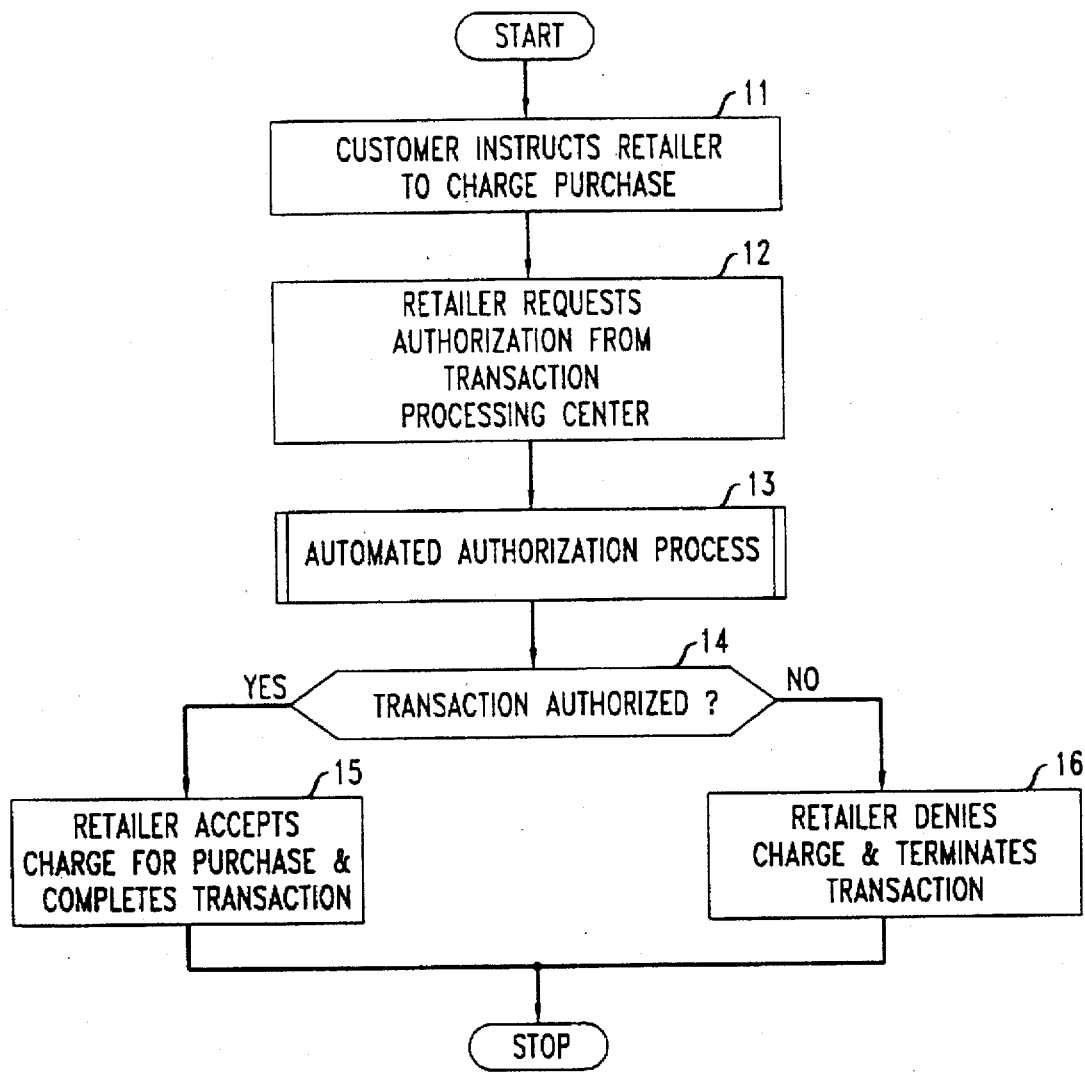
FIG. 9 shows a flow chart of a credit card purchase transaction to which certain illustrative embodiments of the present invention may advantageously be applied.

FIG. 9 shows a flow chart of a credit card purchase transaction to which certain illustrative embodiments of the present invention may advantageously be applied. The transaction is initiated by a cardholder (i.e., the customer) who instructs a retailer to charge a purchase to a given credit card account (step 11). This instruction usually takes the form of providing a credit card or a credit card number to the retailer. This transaction may occur with the customer and the retailer co-present and in real-time, while the customer is waiting. In this case, the timeliness with which the authorization process is completed is clearly of great importance, since the relevant parties are awaiting such authorization before they may proceed with other endeavors. (For example, they may be waiting so that the retailer may hand over the goods to the customer or provide a service thereto.) Thus, the communication to the customer and a confirmation or denial of authorization by the customer should advantageously occur quickly. For this reason, the use of two-way pagers is preferred for this type of application of the principals of the present invention.

In alternative applications, the customer may have instructed the retailer (or an agent of the retailer) in person or via some communication mechanism (e.g., a phone, mail, facsimile or electronic mail) at a time prior to the initiation of the transaction. Such instructions might cover an immediate one-time purchase, a future purchase (e.g., the goods or service may not be immediately available) or a series of purchases to occur over a period of time. In cases such as these where the customer and the retailer are not co-present, the parties most typically do not require the authorization to be completed before they may proceed with other endeavors. That is, it may be acceptable in these cases that the authorization process be completed over a longer period of time such as, for example, several hours or even a day. In these cases, therefore, other less immediate communications mechanisms may be used, such as those provided by conventional telephones, e-mail, or, in some circumstances, even physical mail.

In any event, the retailer's typical response to such instructions is to signal a transaction processing center (or a network of such centers) which is associated with the credit card service provider that a particular customer (identified by his or her credit card number) wishes to purchase goods or services of a particular value. Thus, the retailer requests an authorization for the charge from the transaction processing center (step 12). Typically, this request is initiated by swiping the credit card through an automated card reader (such as card reader 101 of FIG. 1) which reads the magnetic stripe on the credit card, dials the transaction processing center, sends the relevant information thereto and receives either an authorization code or a denial in response therefrom. The information transmitted to the transaction processing center typically includes the credit card number, the amount of the contemplated purchase, and the retailer's store identification code (e.g., card number 201, requested credit amount 202, and merchant code 203 of FIG. 2, respectively). The retailer then waits for an authorization from the transaction processing center which represents that the charge will be underwritten (i.e., insured) by the credit card service provider. This authorization is typically sent to the retailer in the form of an authorization code which identifies the transaction and can thereby be used to verify that the authorization process was properly adhered to by the retailer. One typical reason for denial, on the other hand, is that the balance on the customer's account has exceeded (or, if the given purchase were authorized, would exceed) a predetermined credit limit associated with the customer's account. In accordance with certain illustrative embodiments of present invention, another reason for denial is the lack of the receipt of an appropriate confirmation (or the receipt of an explicit denial) by the customer whose account is to be charged.

At the transaction processing center, the authorization process is performed automatically by a computer based system comprising, inter alia, a database (e.g., validation database 106 of FIG. 1) containing account information for each credit card subscriber (step 13). That is, such a system automatically makes the decision whether to authorize or deny the transaction—no human intervention is typically required at the transaction processing center. If the transaction is authorized (decision 14), as is typically indicated by the appearance of the authorization code on the display of the retailer's card reader, the retailer is thereby authorized by the credit card issuer to accept the charge for the purchase. Thus, the charge is accepted and the transaction is completed (step 15). If, on the other hand, the transaction is denied by the transaction processing center (typically indicated by the appearance of a denial code on the card reader's display), the retailer denies the charge and terminates the transaction (step 16).

Figure 10:
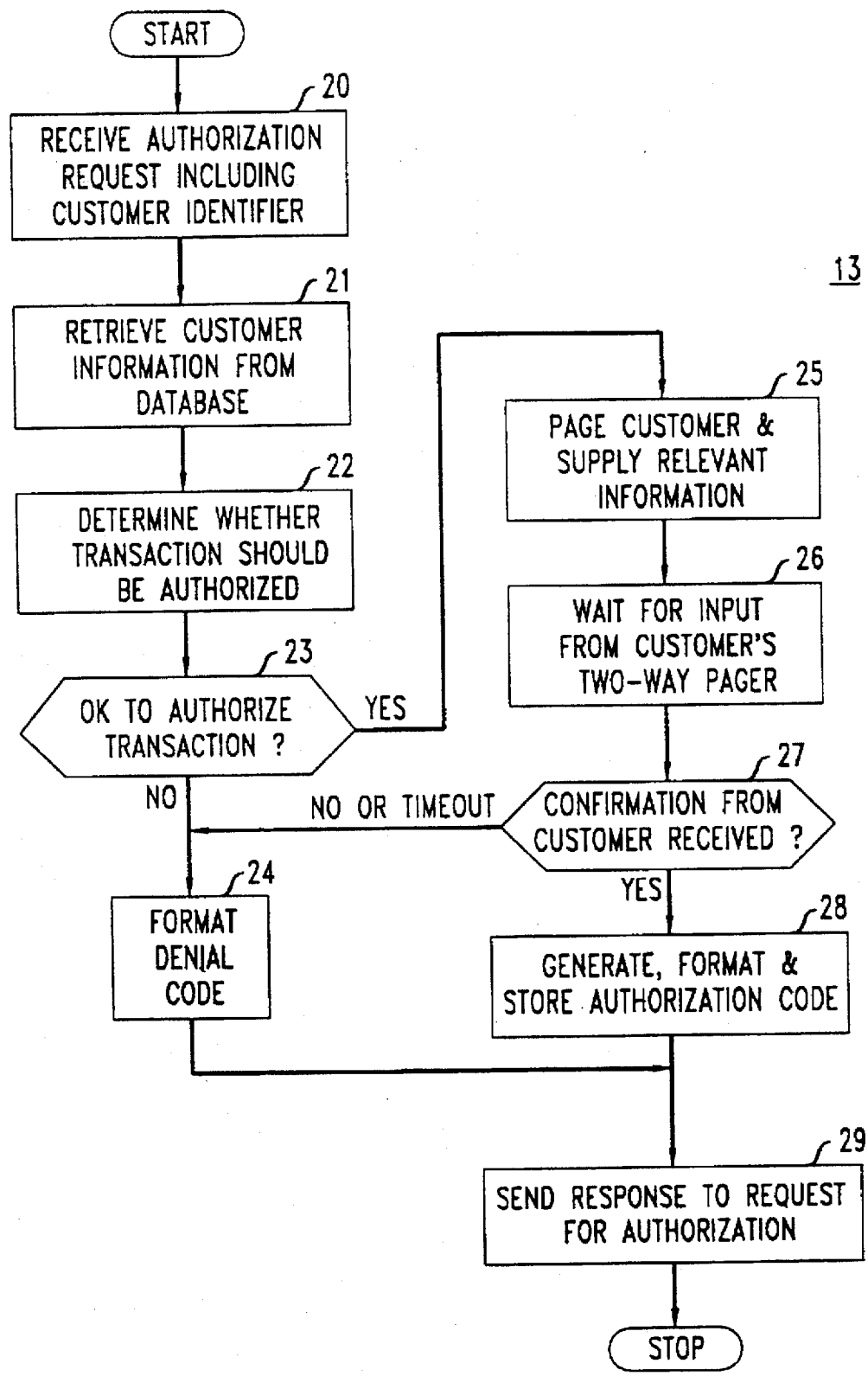
FIG. 10 shows a flow chart of an authorization process in accordance with a second illustrative embodiment of the present invention.

FIG. 10 shows a flow chart of an automated authorization process which may be used to implement step 13 of the process of FIG. 9 in accordance with a second illustrative embodiment of the present invention. The process of FIG. 10 is illustratively executed by a computer system at the transaction processing center in response to each received request for the authorization of a transaction. The received authorization request (typically transmitted by an automated card reader at the retailer's location such as card reader 101 of FIG. 1) includes, in particular, a customer identifier (i.e., the credit card number) and may, for example, also include the amount of the proposed purchase and the retailer's store identification code (step 20). Based on the customer identifier, a database (such as validation database 106 of FIG. 1) is consulted to determine whether the transaction should be authorized (steps 21 and 22). For example, the database may include account balance and credit limit information indicating that the customer's account balance is not permitted to exceed a given credit limit. In such a case, the system will determine that the transaction should not be authorized if the sum of the account balance and the amount of the purchase to be authorized exceeds the credit limit. In addition, invalid or (known to be) stolen credit cards obviously should not be authorized.

If it is determined from the analysis of step 22 that the purchase should not be authorized for some reason (decision 23), the system will format a denial code (step 24). If, on the other hand, there is no basis for denying the transaction, the system will, in accordance with the principles of the present invention, make an attempt to have the (tentative) authorization confirmed by the customer. In particular, and in accordance with a second illustrative embodiment thereof, the system will automatically page the customer (using, for example pager 135 of FIG. 1), supplying to him or her any relevant information concerning the purchase (step 25). For example, the system might supply the customer with an identity of the retailer and/or the amount of the purchase, in order to enable the customer to more accurately ensure that the transaction to be authorized is, in fact, the one he or she is presently undertaking, or, alternatively, that the transaction is one being undertaken by an agent and the principal (i.e., the customer) approves thereof. The customer's pager number (i.e., the telephone number which is used to communicate with the pager) may, for example, be stored in the database and associated with the customer's account, as is shown in FIG. 3.

Once the customer has been paged, the system of the second illustrative embodiment waits for a confirmation from the customer which may be supplied with use of the customer's two-way pager (step 26). If the customer responds with an appropriate confirmation (decision 27), the system generates, formats and stores an authorization code which will enable the transaction to be completed. If, on the other hand, the customer does not confirm the transaction (e.g., if no response is received from the customer within a predetermined amount of time), the system formats a denial code (step 24). After either a denial code or an authorization code has been formatted, it is sent to the retailer (e.g., to card reader 101 of FIG. 1) who originally submitted the authorization request (step 29).

A Third Illustrative Embodiment

Figure 11:
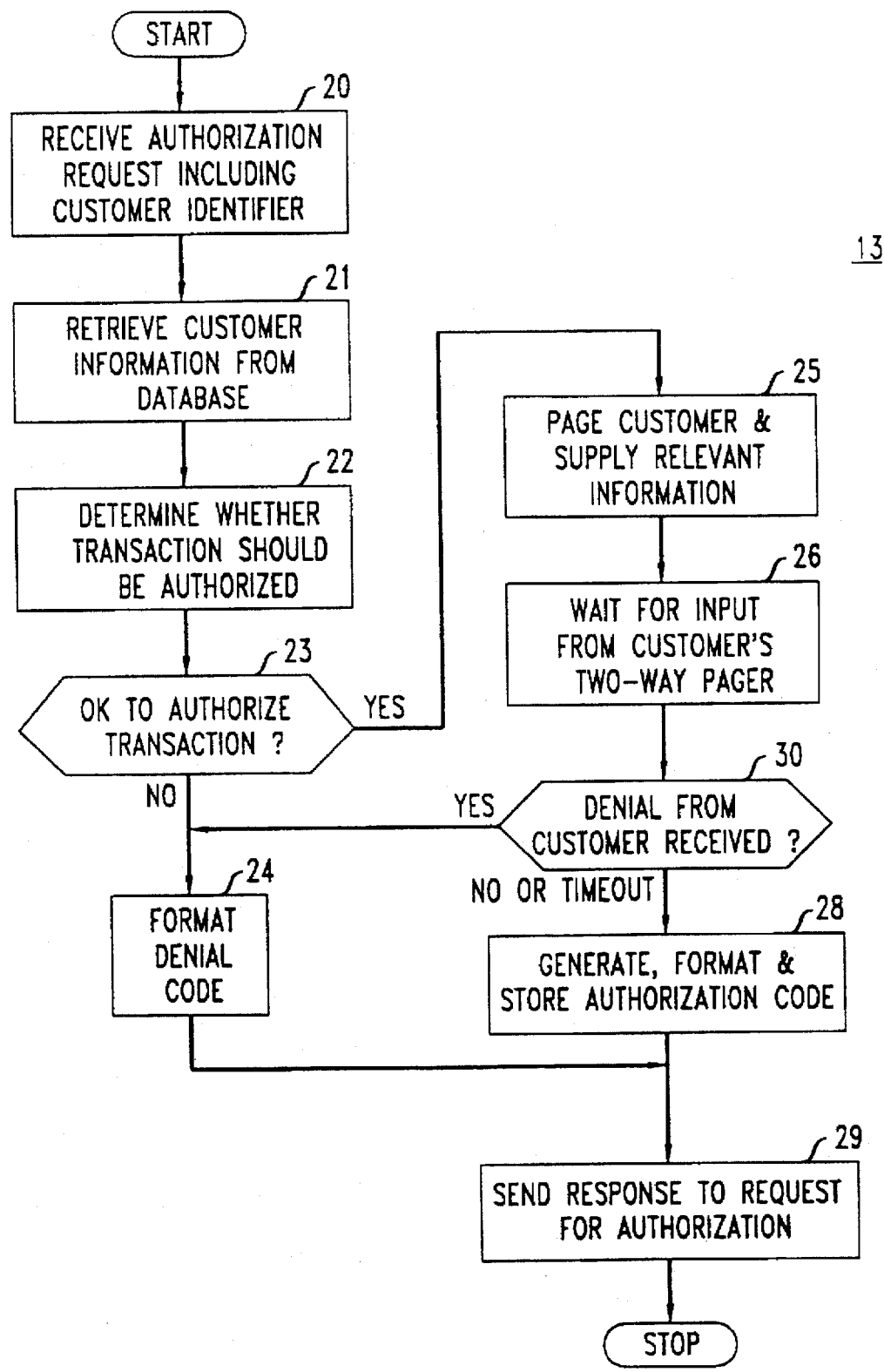
FIG. 11 shows a flow chart of an authorization process in accordance with a third illustrative embodiment of the present invention.

FIG. 11 shows a flow chart of an automated authorization process which may be used to implement step 13 of the process of FIG. 1 in accordance with a third illustrative embodiment of the present invention. As can be seen from the figure, the illustrative process of FIG. 11 is identical to the illustrative process shown in FIG. 10 except that decision 27, which determined whether a confirmation was received from the customer is replaced by decision 30, which determines whether a denial is received from the customer. Other embodiments of the present invention may combine those shown in FIG. 10 and FIG. 11 by accepting either a confirmation or a denial from the customer. In such a case, the default (i.e., timeout) criterion may be either an assumed confirmation or an assumed denial.

A Fourth Illustrative Embodiment

Figure 12:
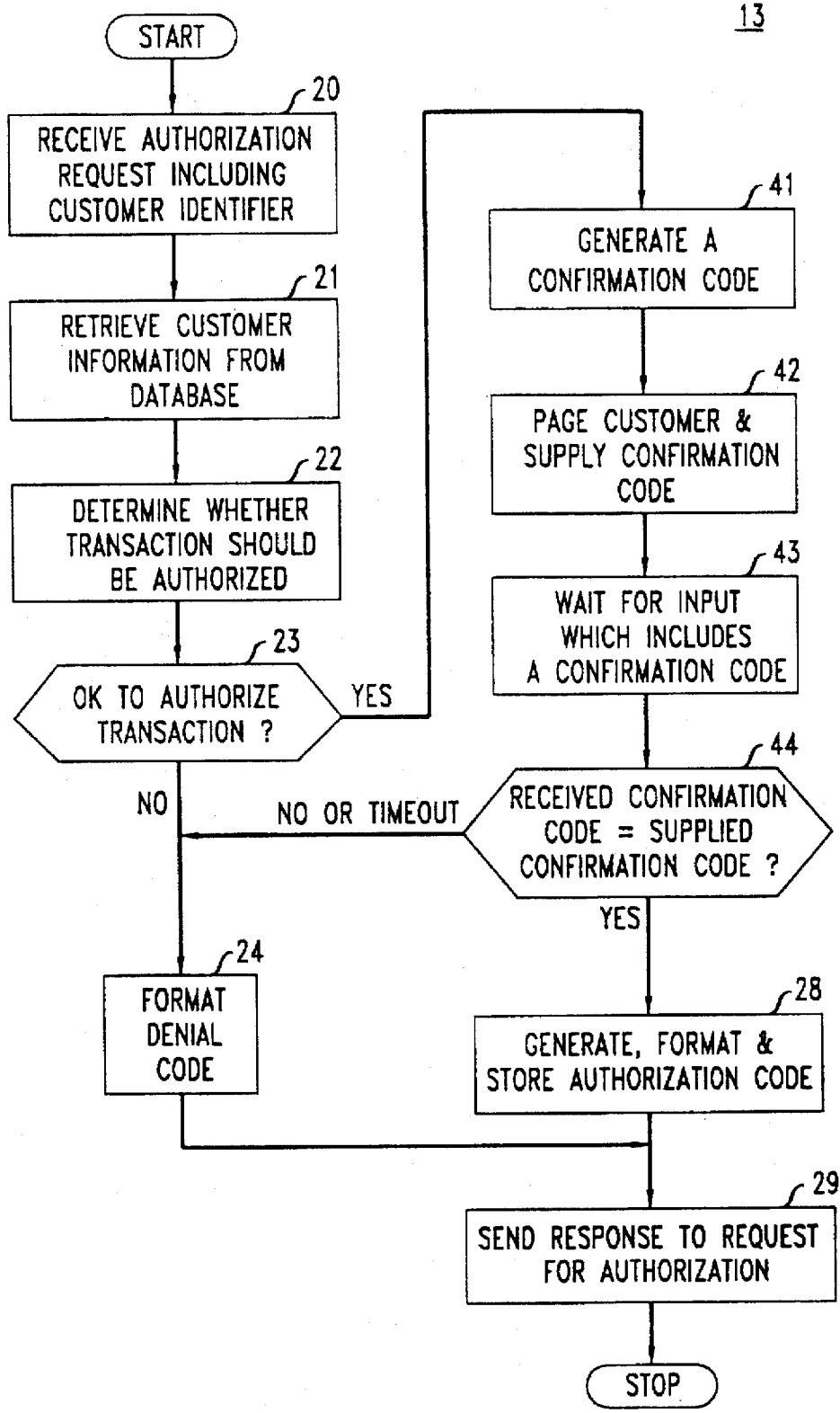
FIG. 12 shows a flow chart of an authorization process in accordance with a fourth illustrative embodiment of the present invention.

FIG. 12 shows a flow chart of an authorization process which may be used to implement step 13 of the process of FIG. 9 in accordance with a fourth illustrative embodiment of the present invention. This fourth embodiment may advantageously be employed when the customer has only a one-way (as opposed to a two-way) pager, since it allows for the customer's confirmation to be communicated indirectly through the retailer. Specifically, the illustrative process of FIG. 12 is identical to that of the illustrative embodiment of FIG. 10 and FIG. 11 except in the mechanism by which the customer confirmation is requested and received.

In particular, when decision 23 determines that it is okay to authorize the transaction, the illustrative system of this fourth embodiment generates a confirmation code and supplies that code to the customer via his or her (one-way) pager (steps 41 and 42). The supplied confirmation code may, for example, be randomly generated so as not to be predictable. In this manner, the confirmation code will be known only to the customer (and not, for example, to a fraudulent user of the customer's credit card number who is not in possession of the customer's pager). The confirmation code may then be used to indirectly confirm the authorization. For example, where the customer is making a face-to-face purchase in a store, the customer may provide the confirmation code supplied by the transaction processing center to the retailer, who may, in turn, provide that confirmation code back to the transaction processing center. This latter step may be performed, for example, with use of the automated card reader which is already in communication with the transaction processing center.

Thus, after the illustrative process of FIG. 12 has supplied the confirmation code to the customer, step 43 waits for a responsive input which includes a (return) confirmation code (e.g., from the automated card reader). Then, the confirmation code which was supplied for the given transaction is compared to the confirmation code that was received (decision 44) to ensure that the customer is, in fact, providing a proper confirmation of the authorization. If the supplied confirmation code matches the received confirmation code, the system authorizes the transaction (steps 28 and 29). If they do not match, or if the system receives no responsive confirmation code after a predetermined amount of time has elapsed, the transaction is denied (steps 24 and 29).

A Fifth Illustrative Embodiment

Figure 13:
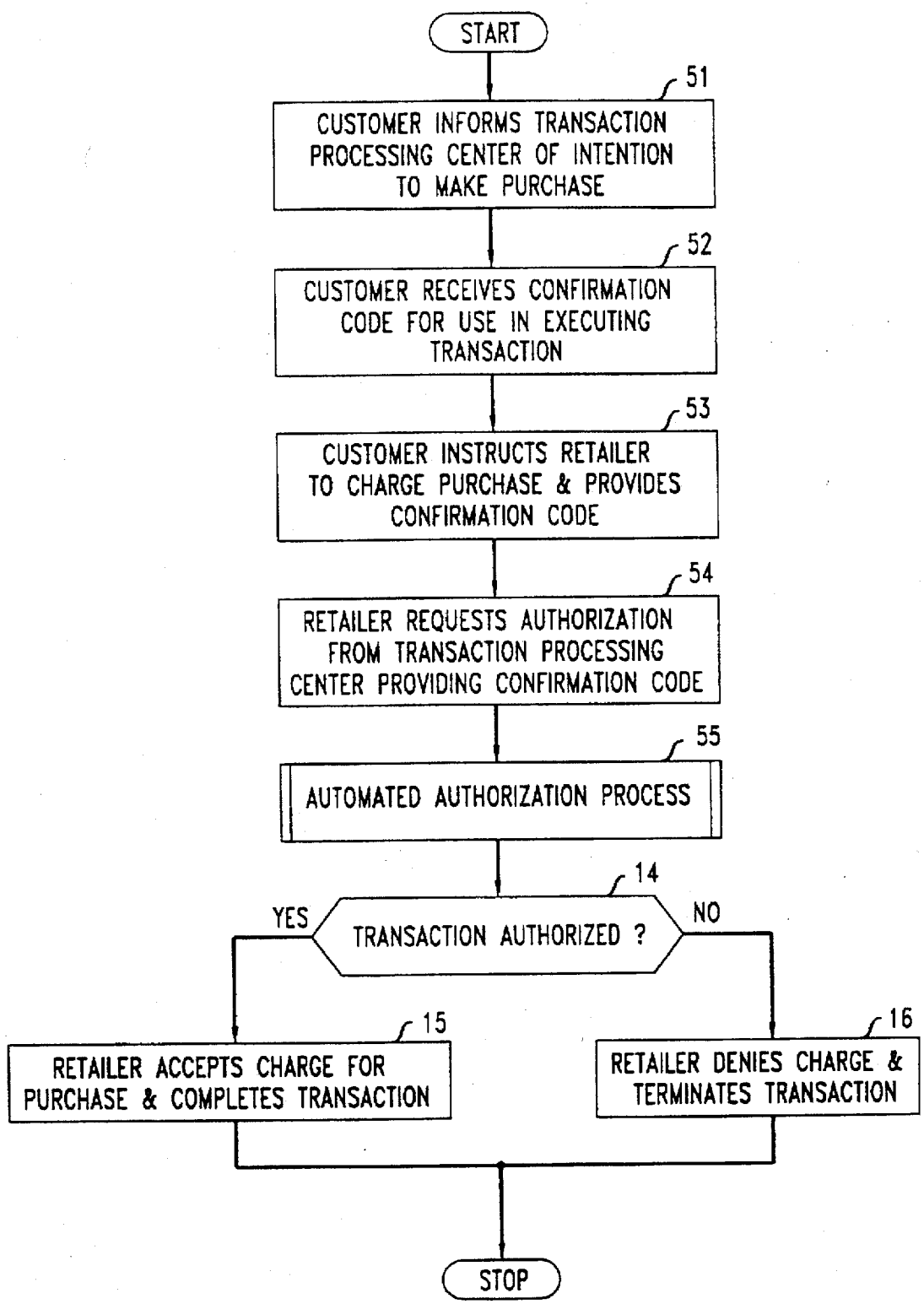
FIG. 13 shows a flow chart of a credit card purchase transaction to which a fifth illustrative embodiment of the present invention may advantageously be applied.

FIG. 13 shows a flow chart of a credit card purchase transaction to which a fifth illustrative embodiment of the present invention may advantageously be applied. This fifth embodiment eliminates the need for performing multiple communications at the time of purchase. That is, the extra time that may otherwise be required to page the customer and receive a confirmation or denial of the pending authorization are not needed when this fifth illustrative embodiment is employed.

Prior to the initiation of the transaction itself, the customer requests and receives a confirmation code for use in a specifically identified subsequent transaction (steps 51 and 52). This confirmation code, which may, for example, be randomly generated, will be known only to the customer who intends to execute the specific transaction (e.g., make a particular purchase), or, alternatively, to an agent of the customer (i.e., the principal) to whom the customer has communicated the given confirmation code. The specific transaction may, for example, be identified based on the retailer's store identification code (such as merchant code 203 of FIG. 2) or other identifying indicia of the retailer. Then, when the purchase is initiated, the customer (or the principal's informed agent) provides the previously received confirmation code to the retailer, who, in turn, provides the confirmation code to the transaction processing center which performs the automated authorization process (steps 53–55). The automated authorization system can then use the received confirmation code in a manner similar to that of the fourth illustrative embodiment shown in FIG. 12 for purposes of confirming an authorization of the transaction. Note that since the two-way communication process of steps 51 and 52 need not occur at the time (or at the location) of the purchase but, rather, may precede the transaction by a substantial amount of time, a wide variety of communications devices (in addition to one-way or two-way pagers) may advantageously be used in realizing the fifth illustrative embodiment.

Figure 14:
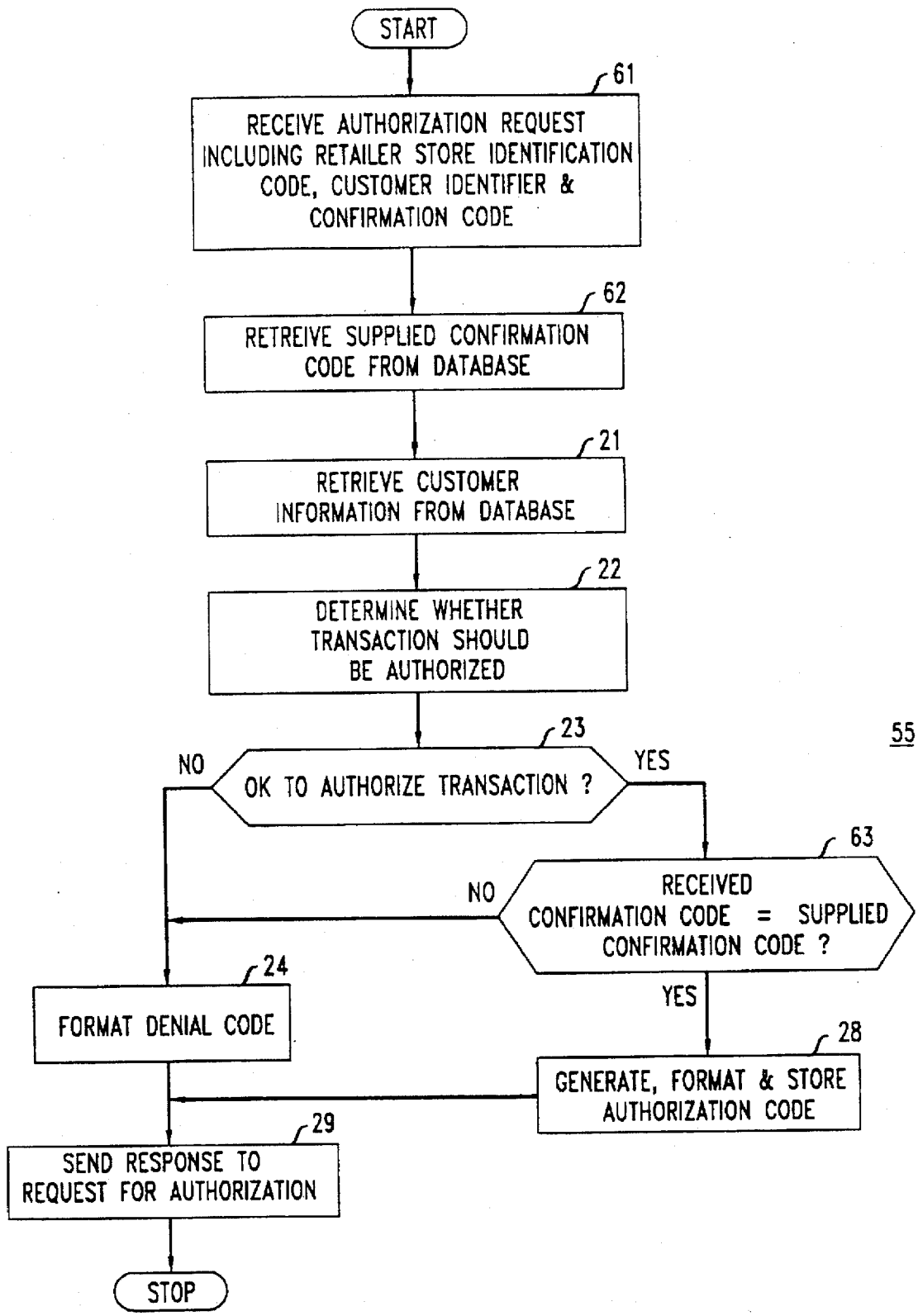
FIG. 14 shows a flow chart of an authorization process in accordance with a fifth illustrative embodiment of the present invention.

FIG. 14 shows a flow chart of an automated authorization process which may be used to implement step 55 of the process of FIG. 13 in accordance with the fifth illustrative embodiment of the present invention. As described above, upon the receipt of a customer's request for a confirmation code to be used in executing a specific (future) transaction, the illustrative authorization system generates and supplies a confirmation code to the customer. In addition to its being supplied to the customer, however, this confirmation code is associated with the customer identifier and, for example, the retailer store identification code, and this data is then stored in the transaction processing center database (e.g., validation database 106 of FIG. 1) for later retrieval—that is, when the identified transaction is actually executed. Thus, upon a request for authorization of the given transaction, the illustrative process of FIG. 14 retrieves the previously supplied confirmation code from the database based on the customer identifier and the retailer store identification code (steps 61 and 62). Then, after it is determined that the transaction should (otherwise) be authorized, the system verifies that the confirmation code received with the request for authorization matches the confirmation code previously supplied to the customer (decision 63). If they do in fact match, the authorization may be confirmed (steps 28 and 29).

A Sixth Illustrative Embodiment

In accordance with a sixth illustrative embodiment of the present invention, a confirmation code may be provided to a customer without the customer making a specific request therefor. This embodiment may be advantageously applied to a credit card purchase transaction in a similar manner to the fifth illustrative embodiment described above. In particular, the flow chart shown in FIG. 13 may be modified by removing step 51 therefrom. Then, instead of the customer requesting and receiving a confirmation code for use in a specifically identified subsequent transaction, the customer (automatically) receives a new confirmation after each transaction and/or periodically (e.g., each morning) for use in his or her next transaction. By limiting the use of the given confirmation code to, for example, a single transaction, the advantages of the present invention in protecting against fraudulent transactions is obtained, while no direct communication from the customer to the transaction processing center is required. Thus, for example, as in the case of the fourth and fifth illustrative embodiments, one-way pagers may advantageously be used. Moreover, the use of a confirmation code which does not match the last previously supplied confirmation code but, rather, matches one used in a previous transaction may well be indicative of fraud.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention. For example, although the embodiments described above have focused on a credit card purchase transaction, it will be obvious to those of ordinary skill in the art that the principles of the present invention may be applied to a wide variety of transactions including, but not limited to, telephone calling card transactions, banking transactions including those using PINs, stock and commodity trading transactions, and secure access transactions such as computer access transactions based on computer passwords. In addition, the principals of the present invention may be applied to numerous other types of secure access transactions such as physical access (i.e., entry) transactions including those used for purposes of inventory control. For example, an entry door to a secure room (e.g., a hospital's medication room) or to a secure facility may be locked by an electronic locking system (e.g., combination keypad or card access entry) which is electronically linked to a central facility such as the transaction processing center described above. Then, any attempt to enter the room or facility may be made subject to confirmation in accordance with the principals of the present invention.

In addition, although the above embodiments focused primarily on communication via wireless paging devices (e.g., one-way or two-way pagers), it will be obvious to those skilled in the art that many other communications mechanisms may be used instead of, or in addition to, wireless paging devices. These mechanisms include, for example, cellular telephones, conventional wired telephones, personal computers, etc.

We claim:

1. An automated method for authorizing a transaction, said transaction based on a customer identifier associated with a customer, the method comprising the steps of:

receiving a request to authorize said transaction, said request including said customer identifier;

determining, in response to said request and based on said customer identifier, whether to authorize said transaction;

when said determining step determines that said transaction is to be authorized, communicating said determination to said customer;

after the step of communicating said determination, receiving a communication from said customer confirming that said customer consents to said transaction being authorized; and authorizing said transaction in response to said communication received from said customer.

2. The method of claim 1 wherein said transaction comprises a sales transaction and wherein said customer identifier comprises a credit card number.

3. The method of claim 1 wherein said transaction comprises placing a telephone call and wherein said customer identifier comprises a telephone calling card number.

4. The method of claim 1 wherein said transaction comprises a banking transaction and wherein said customer identifier comprises a bank card number.

5. The method of claim 1 wherein said customer identifier comprises a Personal Identification Number.

6. The method of claim 1 wherein said step of communicating said determination to said customer comprises transmitting signals representative of said determination to a wireless telecommunications receiver.

7. The method of claim 6 wherein said wireless telecommunications receiver comprises a display and wherein said step of communicating said determination to said customer comprises communicating said customer identifier to said customer.

8. The method of claim 6 wherein said wireless telecommunications receiver comprises a display and wherein said step of communicating said determination to said customer comprises communicating an identity of said provider to said customer.

9. The method of claim 6 wherein said wireless telecommunications receiver comprises a pager.

10. The method of claim 6 wherein said wireless telecommunications receiver comprises a two-way pager and wherein said communication from said customer confirming that said customer consents to said transaction being authorized is transmitted by said customer with use of said two-way pager.

11. An automated method for authorizing a transaction, said transaction based on a customer identifier associated with a customer, the method comprising the steps of:
receiving a request to authorize said transaction, said request including said customer identifier;
determining, in response to said request and based on said customer identifier, whether to authorize said transaction;
when said determining step determines that said transaction is to be authorized, communicating said determination to said customer; and
determining whether a communication indicating that said transaction is not to be authorized is received within a given amount of time from said customer; and
authorizing said transaction if said communication from said customer is not received within said given amount of time.

12. The method of claim 11 wherein said transaction comprises a sales transaction and wherein said customer identifier comprises a credit card number.

13. The method of claim 11 wherein said transaction comprises placing a telephone call and wherein said customer identifier comprises a telephone calling card number.

14. The method of claim 11 wherein said transaction comprises a banking transaction and wherein said customer identifier comprises a bank card number.

15. The method of claim 11 wherein said customer identifier comprises a Personal Identification Number.

16. The method of claim 11 wherein said step of communicating said determination to said customer comprises transmitting signals representative of said determination to a wireless telecommunications receiver.

17. The method of claim 16 wherein said wireless telecommunications receiver comprises a display and wherein said step of communicating said determination to said customer comprises communicating said customer identifier to said customer.

18. The method of claim 16 wherein said wireless telecommunications receiver comprises a display and wherein said step of communicating said determination to said customer comprises communicating an identity of said provider to said customer.

19. The method of claim 16 wherein said wireless telecommunications receiver comprises a pager.

20. An automated method for authorizing a transaction, said transaction based on a customer identifier associated with a customer, the method comprising the steps of:
communicating to said customer a confirmation code for use in executing said transaction;
receiving a request to authorize said transaction, said request including said customer identifier and said confirmation code;
determining, in response to said request, based on said customer identifier, and based on whether said received confirmation code matches said confirmation code communicated to said customer, whether to authorize said transaction;
authorizing said transaction if said determining step determines that said transaction is to be authorized.

21. The method of claim 20 wherein said step of communicating to said customer said confirmation code comprises encoding said confirmation code to provide a secure communication thereof.

22. The method of claim 20 wherein said transaction comprises a sales transaction and wherein said customer identifier comprises a credit card number.

23. The method of claim 20 wherein said transaction comprises placing a telephone call and wherein said customer identifier comprises a telephone calling card number.

24. The method of claim 20 wherein said transaction comprises a banking transaction and wherein said customer identifier comprises a bank card number.

25. The method of claim 20 wherein said customer identifier comprises a Personal Identification Number.

26. The method of claim 20 wherein said step of communicating said confirmation code to said customer comprises transmitting a signal representative of said confirmation code to a wireless telecommunications receiver having a display.

27. The method of claim 26 wherein said wireless telecommunications receiver comprises a pager.

28. The method of claim 20 wherein said step of communicating to said customer a confirmation code for use in executing said transaction is performed in response to receiving a communication from said customer indicating that said customer desires to execute said transaction.

29. The method of claim 20 further comprising the step of communicating a second confirmation code to said customer after authorizing said transaction, said second confirmation code for use in executing a second transaction subsequent to said transaction and being different from said confirmation code.

30. An automated method for authorizing a transaction, said transaction based on a customer identifier associated with a customer, the method comprising the steps of:
receiving a request to authorize said transaction, said request including said customer identifier;
determining, in response to said request and based on said customer identifier, whether to authorize said transaction;
when said determining step determines that said transaction is to be authorized, communicating to said customer a confirmation code for use in completing execution of said transaction;
receiving a communication comprising said confirmation code; and
authorizing said transaction in response to said received confirmation code matching said confirmation code communicated to said customer.

31. The method of claim 30 wherein said step of communicating to said customer said confirmation code comprises encoding said confirmation code to provide a secure communication thereof.

32. The method of claim 30 wherein said transaction comprises a sales transaction and wherein said customer identifier comprises a credit card number.

33. The method of claim 30 wherein said transaction comprises placing a telephone call and wherein said customer identifier comprises a telephone calling card number.

34. The method of claim 30 wherein said transaction comprises a banking transaction and wherein said customer identifier comprises a bank card number.

35. The method of claim 30 wherein said customer identifier comprises a Personal Identification Number.

36. The method of claim 30 wherein said step of communicating said confirmation code to said customer comprises transmitting a signal representative of said confirmation code to a wireless telecommunications receiver.

37. The method of claim 36 wherein said wireless telecommunications receiver comprises a pager.

38. An automated system for use in authorizing a transaction, said transaction based on a customer identifier associated with a customer, the system comprising:
a receiver adapted to receive a request to authorize said transaction, said request including said customer identifier;
means for determining, in response to said request and based on said customer identifier, whether to authorize said transaction;
a transmitter adapted to communicate said determination to said customer when said means for determining determines that said transaction is to be authorized;
a receiver adapted to receive a communication from said customer confirming that said customer consents to said transaction being authorized; and
means for authorizing said transaction in response to said communication received from said customer.

39. An automated system for use in authorizing a transaction, said transaction based on a customer identifier associated with a customer, the system comprising:
a receiver adapted to receive a request to authorize said transaction, said request including said customer identifier;
means for determining, in response to said request and based on said customer identifier, whether to authorize said transaction;
a transmitter adapted to communicate said determination to said customer when said means for determining determines that said transaction is to be authorized;
a timer adapted to determine whether a communication indicating that said transaction is not to be authorized is received within a given amount of time from said customer; and
means for authorizing said transaction if said communication from said customer is not received within said given amount of time.

40. An automated system for use in authorizing a transaction, said transaction based on a customer identifier associated with a customer, the system comprising:
a receiver adapted to receive a communication from said customer indicating that said customer desires to execute said transaction;
a transmitter adapted to communicate to said customer a confirmation code for use in executing said transaction;
a receiver adapted to receive a request to authorize said transaction, said request including said customer identifier and said confirmation code;
means for determining, in response to said request, based on said customer identifier, and based on whether said received confirmation code matches said confirmation code communicated to said customer, whether to authorize said transaction; and
means for authorizing said transaction if said means for determining determines that said transaction is to be authorized.

41. An automated system for use in authorizing a transaction, said transaction based on a customer identifier associated with a customer, the system comprising:
a receiver adapted to receive a request to authorize said transaction, said request including said customer identifier;
means for determining, in response to said request and based on said customer identifier, whether to authorize said transaction;
a transmitter adapted to communicate to said customer a confirmation code for use in completing execution of said transaction when said means for determining determines that said transaction is to be authorized;
a receiver adapted to receive a communication comprising said confirmation code; and
means for authorizing said transaction in response to said received confirmation code matching said confirmation code communicated to said customer.

42. A method of processing a transaction, the method comprising the steps of:
receiving information associated with a transaction initiated by an agent of a principal;
retrieving a profile based on said information associated with said transaction;
comparing at least a portion of said information to data included in said profile; and
contemporaneous with said comparison, notifying said principal of said transaction.

43. The method of claim 42 wherein said notifying step further includes the step of transmitting a message to said principal to request approval for the transaction.

44. The method of claim 43 further comprising the steps of:
receiving an approval signal from said principal; and
in response to receiving said approval signal, authorizing said transaction.

45. The method of claim 44 wherein the approval signal from the principal is transmitted from a paging device which received the notification in response to the comparison.

46. The method of claim 43 further comprising the steps of:
receiving a disapproval signal from said principal; and
in response to receiving said disapproval signal, invalidating said transaction.

47. The method of claim 43 further comprising the step of invalidating said transaction when no signal is received from said principal in response to said request for approval message.

48. The method of claim 42 wherein said comparing step further includes the step of determining whether parameters included in said second subset of information exceed threshold values represented by said data included in said profile.

49. A system for processing a transaction, the system comprising:
a database which receives information associated with a transaction initiated by an agent of a principal and which stores a profile defined by said principal;
a processor which a) retrieves said profile from said database based on said information associated with said transaction, and b) compares at least a portion of said information to data included in said profile; and
a network over which a notification signal is transmitted to said principal contemporaneous with said comparison.

50. The system of claim 49 wherein said notification signal includes a message requesting approval of the transaction.

51. The system of claim 50 further comprising:

an end-user device from which an approval signal is transmitted by said principal to said database; and means responsive to receiving said approval signal at said database, for authorizing said transaction.

52. The system of claim 51 further comprising a paging device which a) receives the notification signal in response to the comparison, and b) transmits the approval signal from the principal.

53. The system of claim 50 further comprising:

an end-user device from which a disapproval signal is transmitted by said principal to said database; and means responsive to receiving said disapproval signal at said database, for invalidating said transaction.

54. The system of claim 50 further comprising means for invalidating said transaction when no signal is received from said principal in response to said request for approval message.

55. The system of claim 49 wherein said processor further includes means for determining whether parameters included in said second subset of information exceed threshold values represented by said data included in said profile.

* * * * *